US009588778B2

(12) United States Patent
Chapman et al.

(10) Patent No.: US 9,588,778 B2
(45) Date of Patent: *Mar. 7, 2017

(54) JNI OBJECT ACCESS

(71) Applicant: International Business Machines Corporation, Armonk, NY (US)

(72) Inventors: Graham A. Chapman, Nepean (CA); Charles R. Gracie, Kanata (CA); Daniel J. Heidinga, Ottawa (CA); Karl M. Taylor, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,076

(22) Filed: Jun. 29, 2015

(65) Prior Publication Data

US 2016/0378508 A1 Dec. 29, 2016

(51) Int. Cl.
*G06F 13/00* (2006.01)
*G06F 9/44* (2006.01)

(52) U.S. Cl.
CPC .................... *G06F 9/443* (2013.01)

(58) Field of Classification Search
CPC .. G06F 9/45516; G06F 9/45533; G06F 9/541; G06F 12/0253
USPC ............... 707/813; 717/148; 718/1; 719/328
See application file for complete search history.

(56) References Cited

U.S. PATENT DOCUMENTS

| 6,915,520 | B2 | 7/2005 | Sanchez, II | |
|---|---|---|---|---|
| 7,167,881 | B2 * | 1/2007 | Yasuda | G06F 12/0276 707/999.206 |
| 7,779,054 | B1 * | 8/2010 | Printezis | G06F 12/0276 707/813 |
| 9,032,410 | B1 * | 5/2015 | Kumpera | G06F 9/485 718/102 |
| 2006/0242635 | A1 | 10/2006 | Broussard et al. | |
| 2011/0320682 | A1 | 12/2011 | McDougall et al. | |
| 2011/0321043 | A1 | 12/2011 | Dawson et al. | |

(Continued)

OTHER PUBLICATIONS

Lee et al., "Efficient Java Native Interface for Android Based Mobile Devices," 2011 International Joint Conference of IEEE TrustCom-11/IEEE ICESS-11/FCST-11, DOI 10.1109/TrustCom.2011.162, pp. 1202-1209.

(Continued)

*Primary Examiner* — Andy Ho
(74) *Attorney, Agent, or Firm* — Reza Sarbakhsh (57) ABSTRACT

Embodiments of the present invention disclose a method, system, and computer program product for a JNI object access system. A computer receives a JNI reference and obtains the pointer data and call site of the referenced object. The computer determines whether a record of the object and call site exist and, if not, the respective records are created. The computer applies a heuristic analysis of the object and call site in which it determines whether the object is larger than a threshold size, whether the object is part of a particular region of the heap, whether the call site is associated with a read-only or a read-write function, and whether the object or call site has caused more non-moving garbage collections than a threshold number. Based on the heuristic, the computer either copies the object data or pins the object and any non-moving garbage collections are recorded.

12 Claims, 3 Drawing Sheets

(56) References Cited

U.S. PATENT DOCUMENTS

2014/0068579 A1    3/2014  Dawson et al.
2015/0058381 A1*  2/2015  Wilhelmsson ...... G06F 9/45533
                                                                   707/813

OTHER PUBLICATIONS

Hassanshahi et al., "JNICodejail—Native Code Isolation for Java Programs," PPPJ '13, Proceedings of the 2013 International Conference on Principles and Practices of Programming on the Java Platform: Virtual Machines, Languages, and Tools, Sep. 11-13, 2013, Stuttgart, Germany, doi>10.1145/2500828.2500848, pp. 173-176.
Oracle, "Java Native Interface (JNI): Introduction," http://docs.oracle.com/javase/6/docs/technotes/guides/jni/spec/intro.html#wp725, accessed on Jun. 18, 2015, pp. 1-3.
Chapman et al., "JNI Object Access," U.S. Appl. No. 14/926,049, filed Oct. 29, 2015.
List of IBM Patents or Patent Applications Treated as Related, Jun. 7, 2016, 2 pgs.

* cited by examiner

JNI OBJECT ACCESS

TECHNICAL FIELD

The present invention relates generally to Java Software® (Java is a Registered Trademark of Oracle), and more particularly to optimizing Java Native Interface (JNI) object access.

BACKGROUND

The Java Native Interface (JNI) provides several Application Program Interface (API) functions for accessing data contained objects such as the data contained in primitive arrays. These functions are specified such that the Java Virtual Machine (JVM) has the option of returning either a copy of the object data or mapping a direct pointer to the object. Returning a pointer to the data of an object (pinning) provides direct access to the object data and is advantageous in terms of memory usage because the JVM avoids the cost of allocating the native memory to contain the data, copy the data from the heap object into the native memory, and possible copy the data back when the array access is completed. Conversely, pinning an object is disadvantageous in terms of garbage collection of the heap because while an object is pinned it cannot be moved, potentially impeding many Garbage Collector (GC) techniques which require object movement to alleviate fragmentation and improve object locality (like techniques such as heap compaction). Therefore, while pointing to an object may alleviate native memory use, a pinned object may prevent a GC from operating efficiently.

SUMMARY

Embodiments of the present invention disclose a method, system, and computer program product for a JNI object access system. A computer receives a JNI reference and obtains the pointer data and call site of the referenced object. The computer determines whether a record of the object and call site exist and, if not, the respective records are created. The computer applies a heuristic analysis of the object and call site in which it determines whether the object is larger than a threshold size, whether the object is part of a particular region of the heap, whether the call site is associated with a read-only or a read-write function, and whether the object or call site has caused more non-moving garbage collections than a threshold number. Based on the heuristic, the computer either copies the object data or pins the object and any non-moving garbage collections are recorded.

DETAILED DESCRIPTION

Embodiments of the present invention will now be described in detail with reference to the accompanying figures.

Figure 1:
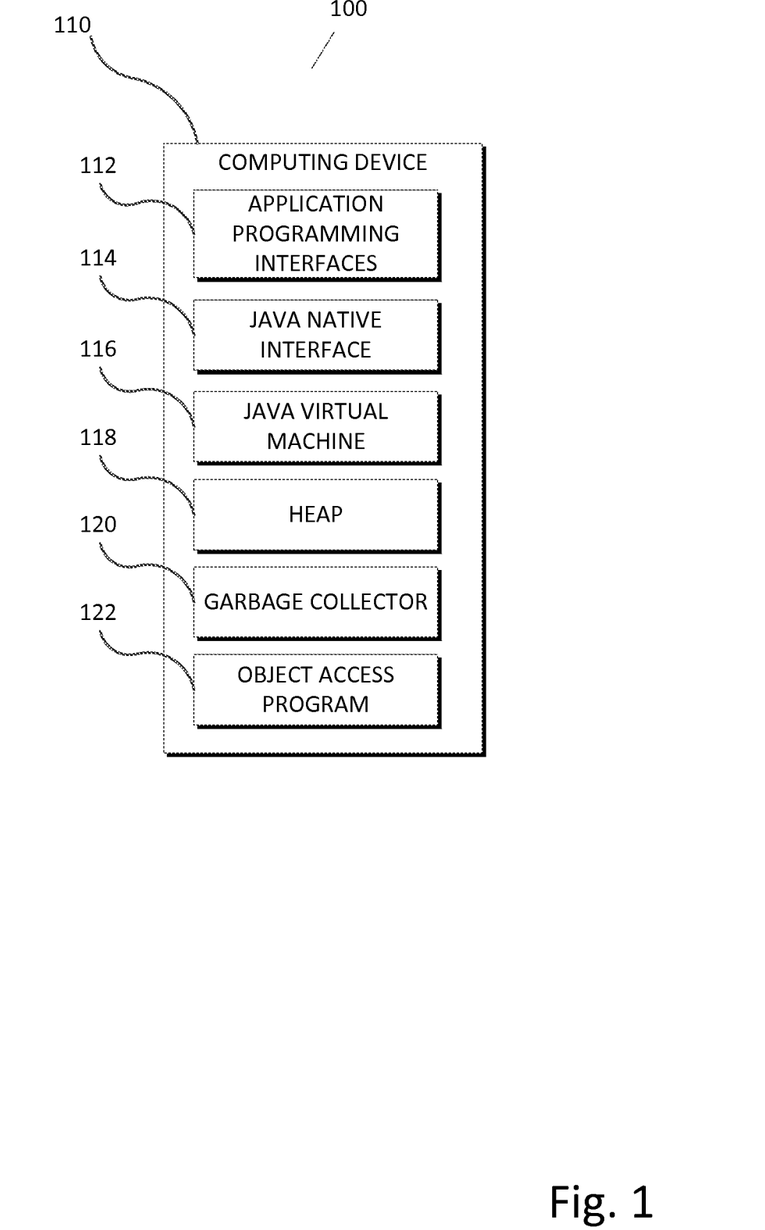
FIG. 1 illustrates a JNI object access system, in accordance with an embodiment of the invention.

FIG. 1 illustrates a JNI object access system 100, in accordance with an embodiment of the invention. In the example embodiment, the JNI object access system 100 includes computing device 110.

Computing device 110 includes Application Programming Interfaces (API) 112, Java Native Interface (JNI) 114, Java Virtual Machine (JVM) 116, heap 118, garbage collector 120, and object access program 122. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

Application programming interfaces (API) 112 is a collection of routines, protocols, and tools developers use to create Java applications. In the example embodiment, API 112 allows for application development by providing the tools to complete many common programming tasks including string manipulation, date/time processing, networking, and implementing data structures. In the example embodiment, API 112 is stored locally on computing device 110, however in other applications API 112 may be stored remotely and accessed via a network such as network 108.

Java Native Interface (JNI) 114 is a programming framework that enables Java code running in a Java Virtual Machine to call and be called (or referenced) by native applications (programs developed for a specific platform) and libraries written in other languages, such as C, C++, and assembly. JNI 114 enables programmers to write native methods (programming language native to the OS, such as C or C++) to handle situations when an application cannot be written entirely in the Java programming language, such as when the standard Java class library does not support the platform-specific features or program libraries.

Java virtual machine (JVM) 116 is an abstract (virtual) computing machine implemented through software on an actual computing machine, such as computing device 110. JVM 116 is platform independent in that the Java code within JVM 116 is written to the same set of interfaces and libraries regardless of the intended operating system. In order to provide compatibility on local operating systems such as Windows® (Windows is a Registered Trademark of Microsoft) or Mac OSX® (Mac OSX is a Registered Trademark of Apple), each JVM implementation translates the Java programming instructions into instructions and commands that run on the local operating system.

Heap 118 is allocated memory where Java objects reside during and after being referenced. In the example embodiment, heap 118 is allocated into three partitions: young generation, old generation, and permanent generation. The young generation partition is where all newly referenced Java objects are allocated and aged. Filling the young generation partition of heap 118 with objects triggers a garbage collection by garbage collector 120 wherein unreferenced objects are marked and removed. Referenced objects, on the other hand, are compacted and retained in the young generation partition of heap 118 until a user-set threshold is met, triggering the movement of the referenced objects to the old generation partition of heap 118 by garbage collector 120. The permanent generation partition of heap 118 contains metadata required by JVM 116 to describe the classes and methods used in an application.

Garbage collector 120 is an application capable of determining which objects of heap memory are referenced and those which are not. A referenced object is an object that is pointed to by a Java program, or in other words is in use. In the example embodiment, garbage collector 118 runs when the young generation partition of heap 118 is filled with referenced and unreferenced objects. In the example embodiment, garbage collector 120 is capable of performing both minor and major garbage collection, however both types of operations are "stop the world events," meaning that all application threads are stopped until the garbage collection operation completes. Furthermore, garbage collector 120 is capable of deleting unreferenced objects to reclaim heap 118 memory formerly occupied by the unreferenced object.

Object access program 122 is a software program on computing device 110 capable of obtaining a heap pointer and pointer data of an object. Object access program 120 is additionally capable of obtaining the call site of an object and determining whether a record of the call site and/or object exists. Object access program 120 is capable of creating a record of an object or call site if a record does not exist and is further capable of increasing an incident occurrence count of a newly created or already existing record. Object access program 120 is additionally capable of applying a heuristic to determine whether it is more advantageous to point to the data of an object or copy the object. Object access program 120 is lastly capable of pointing to, or pinning, object data or copying the object based on the results of applying the heuristic.

Figure 2:
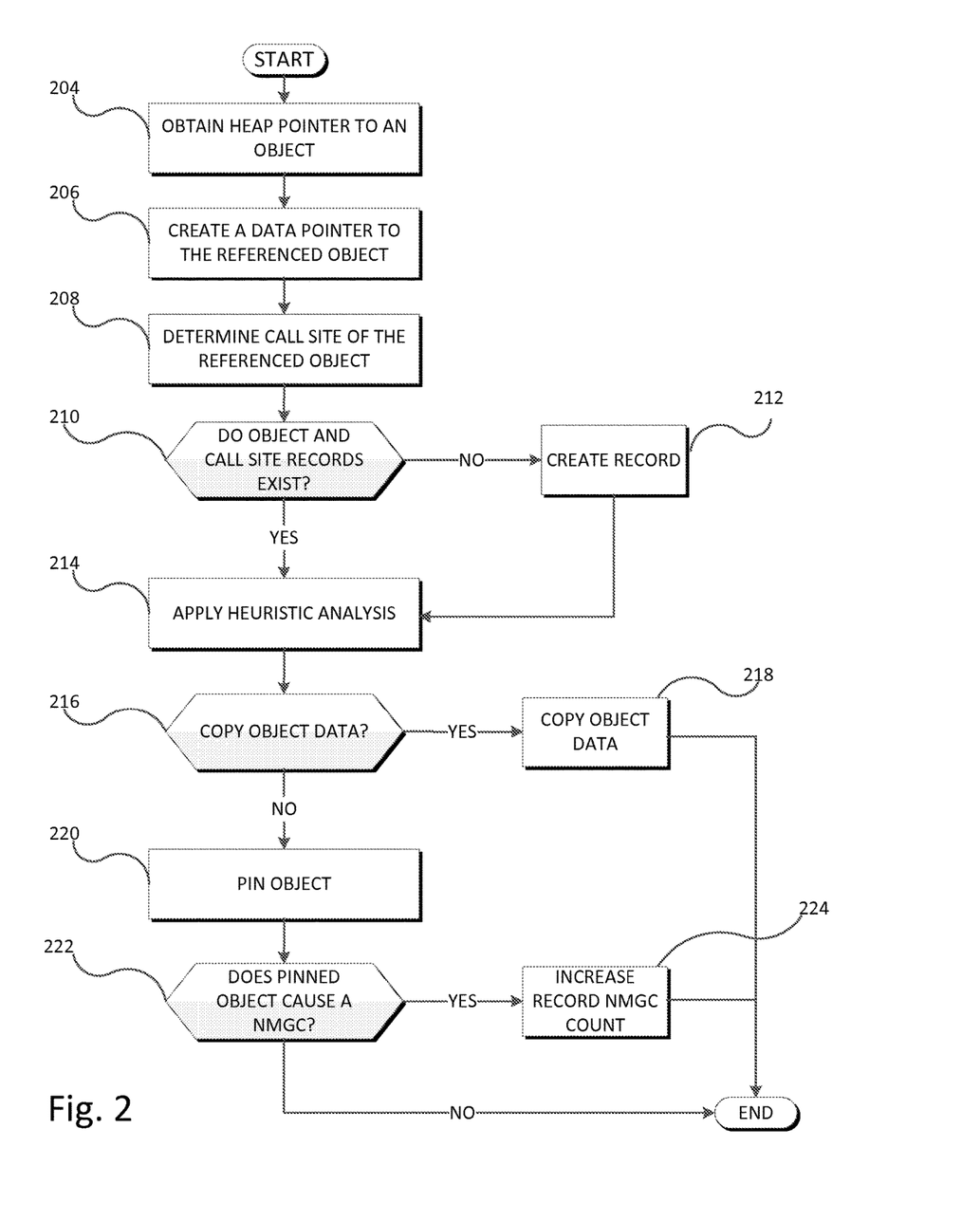
FIG. 2 is a flowchart illustrating the operations of a JNI object access program of FIG. 1 in determining whether a referenced object should be copied or pinned, in accordance with an embodiment of the invention.

FIG. 2 is a flowchart depicting the operation of object access program 122 in determining whether the JVM implementation should return a copy of an object or a direct pointer to an object, in accordance with an embodiment of the present invention. An object is a software bundle of related state and behavior. Software objects can be thought of like many real world objects like, for example, a bicycle. A bicycle has both a state, such as current gear and speed, as well as a behavior, such as changing gear and applying brakes. While there may be millions of different bicycles having differently defined states and behaviors, all bicycles that can be created from the same or similar components belong to the same class. In the bicycle example above, one particular bicycle with specified state and behavior is known as an instance in the class of objects known as bicycles. Java objects, much like the bicycle, also have related states and behaviors. The state of an object is stored in fields, or variables, and exposes its behavior through methods, or functions Like the bicycle, individual Java objects are known as instances within classes made up of objects comprising the same or similar components. Java objects are created on heap 118 and reside there while referenced. The heap is created when JVM 116 starts up and may increase or decrease in size while an application runs. When an object is no longer referenced, the unreferenced object in heap 118 is removed by garbage collector 120 to reclaim heap 118 memory. When JVM 116 needs to reference an object located in heap 118, such as an array, JVM 116 has the option of pointing to the object data or returning a copy. Returning a copy is more memory intensive as JVM 116 must allocate native memory to copy the object data and possibly overwrite the original object data with the edited copy after referencing has completed. On the other hand, pointing to an object, or pinning an object, impedes garbage collector 120 by preventing object movement and defragmentation. When garbage collector 120 is prevented from collecting garbage because of a pinned object, it is known as a non-moving garbage collection, or NMGC. Object access program 122 determines the optimal situations in which to copy or pin an object.

Object access program 120 obtains a JNI reference from JVM 116 which contains a heap pointer to an object identifying the object in heap 118 (step 204). JNI references are an indirect reference to the heap pointer which allows garbage collector 120 to move the object and update the JNI reference. Direct references, however, prevent the object from being moved by garbage collector 120. Direct references to object data are provided when native functions, or functions not written in Java code, request brief access to a critical region in which the object data is pinned rather than copied. Critical regions are granted for brief periods of time and are advantageous in terms of performance because pinning an object removes the need to allocate native memory to copy the object and paste any alterations back to the original copy. Although critical regions are meant to be granted temporarily, often times objects are pinned for long enough to impede GC 120.

Object access program 122 creates a data pointer to the data of the object (step 206). In the example embodiment, the data pointer points to the data of the object being referenced, such as its size and contents. Object access program 122 creates the object data pointer directly from the object stored on heap 118 if the object is pinned, or otherwise from an off-heap 118 copy of the data of the object. The data pointer provides direct access to the data stored in the object, such as providing direct access to elements of an array. This allows executed non-managed code, or functions not written in Java code, to read and modify the array elements via JNI 114.

Object access program 122 determines the call site corresponding to the caller of the object access API function (step 208). The call site is the location, or line of code, where the array access API function is called from, such as the address of an assembly code instruction that performs the call.

Object access program 122 determines whether an object and call site record exist for the object and call site identified in steps 204 and 208 by searching the local directory where call site and object records are stored (decision 210). Object and call site records record statistics of the object or call site, such as how many non-moving garbage collections (NMGCs) the object or call site has caused. While in the example embodiment the record is stored locally on computing device 110, in other embodiments the record may be stored remotely and accessed via network 108.

If a record does not exist (decision 210 "NO" branch), object access program 122 creates a record (step 212) and applies a heuristic analysis (step 214). In the example embodiment, records are stored locally on computing device 110, however in other embodiments, the records may be stored remotely and accessed via network 108.

If a record exists (decision 210 "YES" branch) or a record is created (step 212), object access program 122 applies a heuristic analysis to determine whether the object data should be copied or the object should be pinned (step 214). In the example embodiment, the heuristic analysis performs five evaluations to determine whether JVM 116 should return a pointer to an object or return a copy of the object data, however in other embodiments, object access program 122 may perform any number of evaluations to determine whether copying the object data or pinning the object is favorable.

The first evaluation applied in the heuristic analysis determines whether the size of the object being referenced is larger than a user-set threshold. Because more memory is required to return a copy of a larger sized object, object access program 122 pins objects exceeding the user-set size threshold rather than allocating the large amounts of memory required to copy the object. While pinning the object runs the risk of causing a NMGC, it is likely that encountering a NMGC is still more performant than copying an object exceeding the user-set threshold. For example, if the user sets the size threshold for copying an object at one megabyte (1 MB), then a two megabyte (2 MB) object would be pinned rather than copied.

The second evaluation applied in the heuristic analysis determines whether the object is part of a particular region of heap 118 associated with many or few garbage collections. This test is relevant to particular types of garbage collector 120. For example, a generational garbage collector collects garbage in some parts of heap 118 more frequently than others, resulting in more NMGC's in those regions of the heap. Therefore, if the object is stored in a region of heap 118 prone to many garbage collections, such as the young generation, object access program 122 copies the object data to avoid the potentially large amount of resulting NMGC's which may result from many garbage collections. Conversely, if the object is stored in a region of heap 118 where garbage is not frequently collected, such as the old generation, then the object is pinned because fewer garbage collections reduce the likelihood of a NMGC.

The third evaluation applied in the heuristic analysis determines whether the call site obtained in step 208 is associated with a read or a read-write operation. If the call site is associated with a read-write option, JVM 116 allocates enough memory to copy the object as well as save any changes made to the copy so that the changes can be written back onto the original. Whether the call site is associated with a read-write option is indicated by the JNI 114 which contains a function for specifying the "mode" of an object. When an object is referenced, the "mode" indicator releases data specifying whether any changes made to an object can be discarded without writing back to the original object, thus reducing the memory allocation cost. As less memory is required for call sites associated with read only operations, objects which do not require writing any changes made to the copy back onto the original object are copied rather than pinned. Conversely, call sites associated with read-write operations are pinned because a write operation requires more memory allocation necessary to save changes to the copy of the object.

The fourth evaluation applied in the heuristic analysis determines whether the particular object identified in step 206 is the source of a number of NMGC's which exceeds the user-set threshold. Although this evaluation cannot be applied until an object is pinned several times in order to obtain NMGC statistics, this evaluation will become of more and more importance as objects are referenced and pinned frequently. Object NMGC's are recorded in step 222 (described in greater detail below) and the threshold is set by the user via a user interface on computing device 110. In order to determine whether the object exceeds the threshold amount of NMGC's, object access program 122 compares the user-set threshold with the amount of NMGC's recorded in step 222 and if the object has caused more NMGC's than the user-set threshold, the object is copied.

Similarly, the fifth evaluation applied in the heuristic analysis determines whether the call site identified in step 208 is the source of a number of NMGC's which exceeds the user-set threshold Like the fourth evaluation, this determination is not of much value until call site NMGC's can be compiled after pinning several objects from a call site and determining whether they cause an NMGC. The threshold number is set by the user via a user interface on computing device 110. Object access program 122 compares the user-set threshold with the amount of NMGC's recorded in step 214 and if the particular call site has caused more NMGC's than the user-set threshold, the object is copied.

Object access program 122 determines whether the object data should be copied based on the results of applying the heuristic (decision 216). In the example embodiment where five evaluations are applied, object access program 122 is configured to pin an object by default unless the majority of the evaluations indicate that the object should be copied instead. Similarly, if the results of the heuristic are split (a tie), the object will be pinned in order to obtain additional NMGC statistics on a particular object and/or call site in an effort to increase the criteria from which the evaluation are based. In other examples, objects may be copied if any number of evaluations suggest an object should be copied. For example, if an object is consistently pinned by default and consistently results in NMGC's, eventually the NMGC count will exceed the threshold of the fourth evaluation, potentially serving as the swing vote to copy the object the next time it is referenced.

If the object data should be copied (decision 216 "YES" branch), then object access program 122 copies the object data (step 218). The object data is copied from the heap and stored into newly allocated memory.

If the object data should not be copied (decision 216 "NO" branch), then object access program 122 pins the object (step 220). The object is pinned and a pointer to the object data is returned to the caller.

Object access program 122 determines whether the pinned object causes an NMGC by monitoring the performance of garbage collector 120 (decision 222). If a pinned object causes an NMGC, garbage collector 120 is prevented from completing the garbage collecting process.

If the pinned object causes a NMGC (decision 222 "YES" branch), then object access program 122 increases the record NMGC count (step 224). The record NMGC occurrence count records all instances when a pinned object impedes garbage collector 120 and is utilized in the fourth and fifth evaluations applied by the heuristic. For example, if JVM 116 referencing an integer array object and the pinned object impedes garbage collector 120 from reclaiming heap 118 memory, then the record of NMGC's corresponding to the integer array object is incremented. Similarly, if a particular call site is frequently observed to cause NMGC's, then the record of NMGC's corresponding to the call site is incremented for each NMGC caused.

If the pinned object does not cause a NMGC (decision 222 "NO" branch), then object access program 122 ends.

Figure 3:
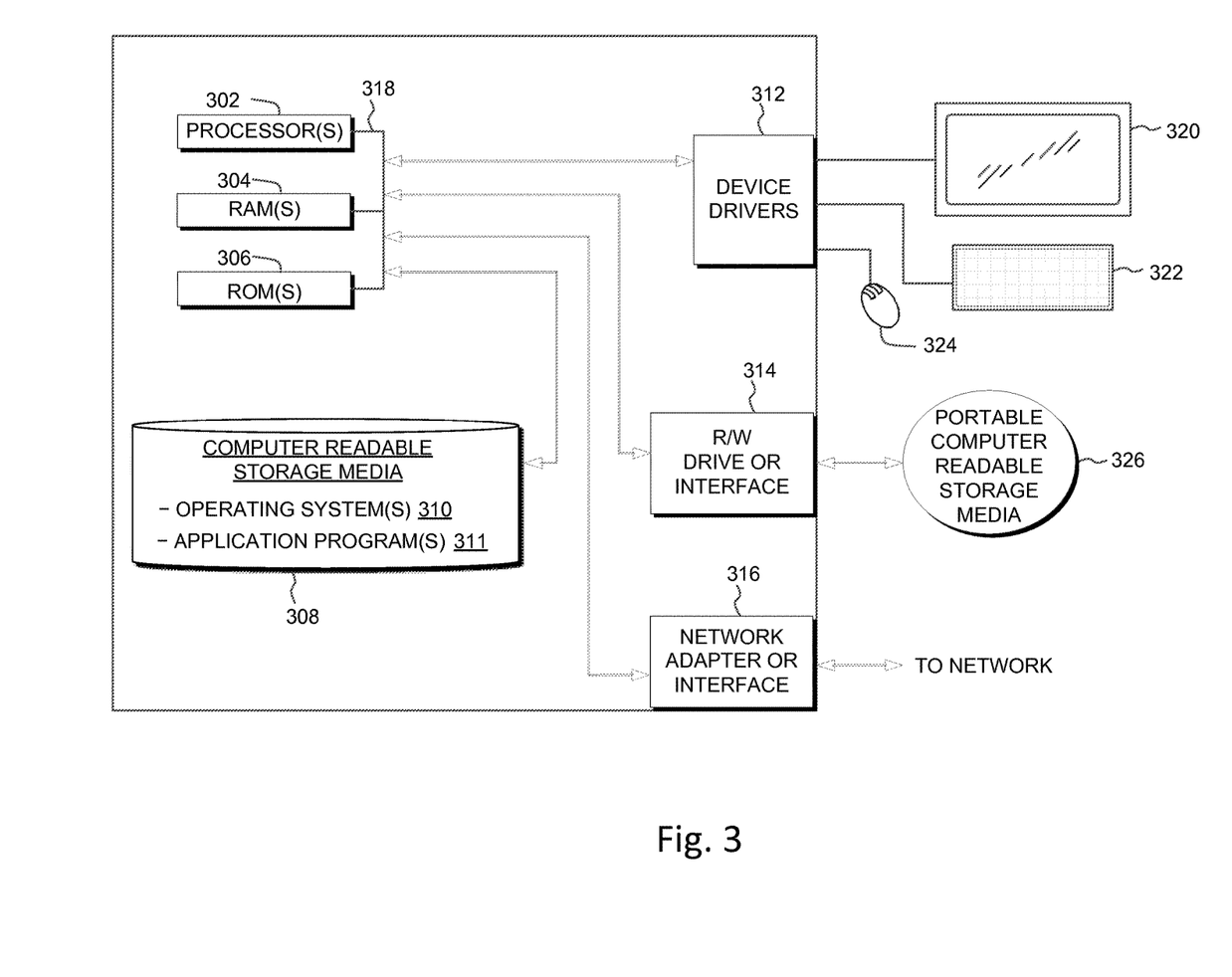
FIG. 3 is a block diagram depicting the hardware components of a JNI object access system of FIG. 1, in accordance with an embodiment of the invention.

FIG. 3 depicts a block diagram of components of computing device 110 of a JNI object access program system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, object access program 122, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for JNI object access, the computer program product comprising:
    one or more computer-readable storage media and program instructions stored on the one or more computer-readable storage media for execution by one or more processors, the program instructions comprising:
        program instructions to detect a java native interface (JNI) reference referring to an object from a call site, wherein the call site is a portion of code corresponding to the JNI reference;
        program instructions to determine whether a record for the object exists, and based on determining that a record for the object does not exist, creating the record for the object;
        program instructions to determine whether a record for the call site exists, and based on determining that a record for the call site does not exist, creating the record for the call site;
        program instructions to apply a heuristic evaluation, wherein the heuristic evaluation includes performing at least one of:
            program instructions to determine whether the object is larger than a threshold size,
            program instructions to determine whether the object is stored in a particular region of a heap, wherein the heap is an allocated memory,
            program instructions to determine whether the call site of the object is associated with at least one of a read only function and a read-write function,
            program instructions to determine whether an amount of non-moving garbage collections (NMGC) caused by the object is greater than a record threshold number, wherein the NMGCs is caused by a garbage collector being unable to move the object when pinned, and wherein the amount of NMGCs caused by the object are recorded in the record for the object, and
            program instructions to determine whether an amount of NMGCs caused by the call site is greater than a call site threshold number, wherein the amount of NMGCs caused by the call site are recorded in the record for the call site; and
        program instructions to perform at least one of pinning and copying the object based on results of the heuristic evaluation.

2. The computer program product of claim 1, further comprising:
    based on pinning the object, program instructions to determine whether at least one of the object and the call site caused the NMGC;
    based on determining that the object caused the NMGC, program instructions to increase the amount of NMGCs caused by the object in the record for the object; and
    based on determining that the call site caused the NMGC, program instructions to increase the amount of NMGCs caused by the call site in the record for the call site.

3. The computer program product of claim 1, wherein the heuristic evaluation may include one or more additional evaluations.

4. The computer program product of claim 1, wherein determining that the call site is associated with the read only function denotes that it is unnecessary to save any changes made to the object, and wherein determining that the call site is associated with the read-write function requires saving any changes made to the object.

5. The computer program product of claim 1, wherein determining whether the object is stored in a particular region of a heap further comprises determining whether the object is stored in a young generation, an old generation, or a permanent generation of the heap.

6. The computer program product of claim 1, wherein the object threshold number and the call site threshold number are input by a user.

7. A computer system for JNI object access, the computer system comprising:
one or more computer processors, one or more computer-readable storage media, and program instructions stored on one or more of the computer-readable storage media for execution by at least one of the one or more processors, the program instructions comprising:
program instructions to detect a java native interface (JNI) reference referring to an object from a call site, wherein the call site is a portion of code corresponding to the JNI reference;
program instructions to determine whether a record for the object exists, and based on determining that a record for the object does not exist, creating the record for the object;
program instructions to determine whether a record for the call site exists, and based on determining that a record for the call site does not exist, creating the record for the call site;
program instructions to apply a heuristic evaluation, wherein the heuristic evaluation includes performing at least one of:
program instructions to determine whether the object is larger than a threshold size,
program instructions to determine whether the object is stored in a particular region of a heap, wherein the heap is an allocated memory,
program instructions to determine whether the call site of the object is associated with at least one of a read only function and a read-write function,
program instructions to determine whether an amount of non-moving garbage collections (NMGC) caused by the object is greater than a record threshold number, wherein the NMGCs is caused by a garbage collector being unable to move the object when pinned, and wherein the amount of NMGCs caused by the object are recorded in the record for the object, and
program instructions to determine whether an amount of NMGCs caused by the call site is greater than a call site threshold number, wherein the amount of NMGCs caused by the call site are recorded in the record for the call site; and
program instructions to perform at least one of pinning and copying the object based on results of the heuristic evaluation.

8. The computer system of claim 7, further comprising:
based on pinning the object, program instructions to determine whether at least one of the object and the call site caused the NMGC;
based on determining that the object caused the NMGC, program instructions to increase the amount of NMGCs caused by the object in the record for the object; and
based on determining that the call site caused the NMGC, program instructions to increase the amount of NMGCs caused by the call site in the record for the call site.

9. The computer system of claim 7, wherein the heuristic evaluation may include one or more additional evaluations.

10. The computer system of claim 7, wherein determining that the call site is associated with the read only function denotes that it is unnecessary to save any changes made to the object, and wherein determining that the call site is associated with the read-write function requires saving any changes made to the object.

11. The computer system of claim 7, wherein determining whether the object is stored in a particular region of a heap further comprises determining whether the object is stored in a young generation, an old generation, or a permanent generation of the heap.

12. The computer system of claim 7, wherein the object threshold number and the call site threshold number are input by a user.

* * * * *